United States Patent
Cote (10) Patent No.: US 12,122,698 B2
(45) Date of Patent: Oct. 22, 2024

(54) MABR MEDIA FOR SUPPORTING AOB AND ANNAMOX BACTERIA AND PROCESS FOR DEAMMONIFICATION OF WASTEWATER

(71) Applicant: BL TECHNOLOGIES, INC., Minnetonka, MN (US)

(72) Inventor: Pierre Lucien Cote, Ancaster (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 377 days.

(21) Appl. No.: 17/284,568

(22) PCT Filed: Oct. 18, 2019

(86) PCT No.: PCT/US2019/057036
§ 371 (c)(1),
(2) Date: Apr. 12, 2021

(87) PCT Pub. No.: WO2020/086407
PCT Pub. Date: Apr. 30, 2020

(65) Prior Publication Data
US 2021/0355011 A1    Nov. 18, 2021

Related U.S. Application Data

(60) Provisional application No. 62/749,259, filed on Oct. 23, 2018.

(51) Int. Cl.
*C02F 3/30* (2023.01)
*B01D 63/02* (2006.01)
(Continued)

(52) U.S. Cl.
CPC .............. *C02F 3/307* (2013.01); *B01D 63/02* (2013.01); *C02F 3/1273* (2013.01); *C02F 3/201* (2013.01);
(Continued)

(58) Field of Classification Search
CPC ........ C02F 3/307; C02F 3/1273; C02F 3/201; C02F 3/208; C02F 3/102; C02F 3/103;
(Continued)

(56) References Cited

U.S. PATENT DOCUMENTS

| | | |
|---|---|---|
| 5,078,884 A | 1/1992 | Mulder |
| 5,259,959 A | 11/1993 | Mulder |

(Continued)

FOREIGN PATENT DOCUMENTS

| | | |
|---|---|---|
| CN | 107162177 A | 9/2017 |
| CN | 107428573 A | 12/2017 |

(Continued)

OTHER PUBLICATIONS

Machine-generated English translation of KR 20130060107, generated on Mar. 8, 2023.*

(Continued)

*Primary Examiner* — Fred Prince (57) ABSTRACT

This specification describes a membrane aerated biofilm media and reactor (MABR) having a discontinuous layer of a porous material applied to the outer surface of a gas-transfer membrane. The porous material may have a void fraction of 50% or more. The porous material may have a thickness of up to about 500 microns and a pattern on the same order of magnitude as its thickness. The media may be used to carry on a deammonification reaction. In use, ammonia oxidizing bacteria (AOB) and annamox bacteria grown in or on the media, with the annamox bacteria located primarily in the porous material. The supply of oxygen through the gas-transfer membrane is limited to suppress the growth of nitrite oxidizing bacteria (NOB). Excess biofilm is removed, for example by coarse bubble scouring. The media may be placed in an anoxic zone of an activated sludge plant, which may be upstream of an aerobic zone.

19 Claims, 3 Drawing Sheets

(51) Int. Cl.
*B01D 65/00* (2006.01)
*C02F 3/10* (2023.01)
*C02F 3/12* (2023.01)
*C02F 3/20* (2023.01)
*C02F 3/28* (2023.01)
*C02F 101/16* (2006.01)

(52) U.S. Cl.
CPC .............. *C02F 3/208* (2013.01); *B01D 65/00* (2013.01); *B01D 2313/26* (2013.01); *B01D 2315/16* (2013.01); *C02F 3/102* (2013.01); *C02F 3/103* (2013.01); *C02F 3/2806* (2013.01); *C02F 3/301* (2013.01); *C02F 2101/16* (2013.01); *C02F 2303/20* (2013.01); *Y02W 10/10* (2015.05)

(58) Field of Classification Search
CPC .... C02F 3/2806; C02F 3/301; C02F 2101/16; C02F 2303/20; B01D 63/02; B01D 65/00; B01D 2313/26; B01D 2315/16; Y02W 10/10
USPC ................ 210/603, 615, 650, 903, 500.23
See application file for complete search history.

(56) References Cited

U.S. PATENT DOCUMENTS

| | | | |
|---|---|---|---|
| 5,997,736 A | 12/1999 | Sumino et al. | |
| 6,235,196 B1 | 5/2001 | Zhou et al. | |
| 6,383,390 B1 | 5/2002 | Van Loosdrecht et al. | |
| 6,540,920 B2* | 4/2003 | Bounds ................ | C02F 3/103 210/615 |
| 7,144,508 B2 | 12/2006 | Isaka et al. | |
| 7,267,764 B2 | 9/2007 | Isaka et al. | |
| 7,279,100 B2 | 10/2007 | Devine | |
| 7,314,563 B2 | 1/2008 | Cho et al. | |
| 7,329,341 B2 | 2/2008 | Yamasaki et al. | |
| 7,384,553 B2 | 6/2008 | Isaka et al. | |
| 7,410,584 B2 | 8/2008 | Devine | |
| 7,537,698 B2 | 5/2009 | Sumino et al. | |
| 7,556,961 B2 | 7/2009 | Isaka et al. | |
| 7,713,417 B2 | 5/2010 | Sutton | |
| 7,718,069 B2 | 5/2010 | Laraway et al. | |
| 7,754,081 B2 | 7/2010 | Baba et al. | |
| 7,846,334 B2 | 12/2010 | Wett | |
| 7,879,239 B2 | 2/2011 | Baba et al. | |
| 7,897,375 B2 | 3/2011 | Isaka et al. | |
| 7,972,513 B2 | 7/2011 | Lee et al. | |
| 8,057,673 B2 | 11/2011 | Chang et al. | |
| 8,173,419 B2 | 5/2012 | Isaka et al. | |
| 8,246,830 B2 | 8/2012 | Takeda | |
| 8,293,109 B2 | 10/2012 | Kimura et al. | |
| 2003/0192825 A1* | 10/2003 | Chang ................ | C02F 3/1273 210/490 |
| 2003/0203183 A1 | 10/2003 | Hester et al. | |
| 2004/0238441 A1 | 12/2004 | Yanaka et al. | |
| 2005/0255539 A1 | 11/2005 | Isaka et al. | |
| 2006/0124543 A1 | 6/2006 | Pehrson et al. | |
| 2006/0169636 A1 | 8/2006 | Devine | |
| 2006/0191847 A1 | 8/2006 | Yamasaki et al. | |
| 2007/0108125 A1 | 5/2007 | Cho et al. | |
| 2007/0218537 A1 | 9/2007 | Furukawa et al. | |
| 2007/0272610 A1 | 11/2007 | Isaka et al. | |
| 2008/0116130 A1 | 5/2008 | Devine | |
| 2008/0223783 A1 | 9/2008 | Sutton | |
| 2008/0245730 A1 | 10/2008 | Tokutomi | |
| 2009/0008314 A1 | 1/2009 | Isaka et al. | |
| 2009/0008315 A1 | 1/2009 | Isaka et al. | |
| 2009/0008326 A1 | 1/2009 | Isaka et al. | |
| 2009/0038999 A1 | 2/2009 | Pehrson et al. | |
| 2009/0039015 A1 | 2/2009 | Baba et al. | |
| 2009/0173692 A1 | 7/2009 | Laraway et al. | |
| 2010/0133179 A1 | 6/2010 | Chang et al. | |
| 2010/0219126 A1 | 9/2010 | Baba et al. | |
| 2010/0282654 A1 | 11/2010 | Hauschild | |
| 2011/0203992 A1 | 8/2011 | Liu et al. | |
| 2013/0264280 A1 | 10/2013 | Zhao et al. | |
| 2014/0037915 A1* | 2/2014 | Rebouillat .......... | H01M 8/0245 428/201 |
| 2014/0238931 A1 | 8/2014 | DiMassimo et al. | |
| 2014/0263041 A1 | 9/2014 | Regmi et al. | |
| 2016/0002081 A1* | 1/2016 | Cote ....................... | C02F 11/02 210/151 |
| 2016/0009578 A1 | 1/2016 | Cote et al. | |
| 2016/0304369 A1* | 10/2016 | Xin ...................... | C02F 3/303 |
| 2017/0291839 A1 | 10/2017 | Christensson et al. | |
| 2018/0009687 A1 | 1/2018 | Murthy et al. | |
| 2018/0022625 A1* | 1/2018 | Cote ....................... | C02F 3/208 210/615 |

FOREIGN PATENT DOCUMENTS

| | | | | |
|---|---|---|---|---|
| CN | 107585865 A | | 1/2018 | |
| EP | 1106237 B1 | | 10/2004 | |
| EP | 1595851 A1 | | 11/2005 | |
| EP | 1762547 A1 | | 3/2007 | |
| EP | 1780179 A1 | | 5/2007 | |
| EP | 1990318 A1 | | 11/2008 | |
| EP | 1695942 B1 | | 5/2009 | |
| EP | 1113997 B1 | | 7/2009 | |
| JP | 7088477 A | | 4/1995 | |
| JP | 2005034739 A | | 2/2005 | |
| JP | 2006297374 A | | 11/2006 | |
| JP | 2007222830 A | | 9/2007 | |
| KR | 10-2013-0060107 A | * | 6/2013 | |
| WO | WO-2004018084 A1 | * | 3/2004 | .......... B01D 29/114 |
| WO | 2006058097 A1 | | 6/2006 | |
| WO | 2007055440 A1 | | 5/2007 | |
| WO | 2008115444 A2 | | 9/2008 | |
| WO | 2009049401 A1 | | 4/2009 | |
| WO | 2011106621 A2 | | 9/2011 | |
| WO | 2012019294 A1 | | 2/2012 | |
| WO | 2012019310 A1 | | 2/2012 | |
| WO | 2015142586 A2 | | 9/2015 | |
| WO | 2016209234 A1 | | 12/2016 | |
| WO | 2018136350 A1 | | 7/2018 | |

OTHER PUBLICATIONS

Chinese Patent Application No. CN201980069894.0, Office Action dated Sep. 13, 2022.
Gong, et al., "Feasibility of a Membrane-aerated Biofilm Reactor to Achieve Single-stage Autotrophic Nitrogen Removal Based on Anammox", Chemosphere, 2007, vol. 69(5), pp. 776-784.
Bunce, R.W., et al., "Modification of a B-Stage MLE to Take Advantage of SND and Nitrite Shunt in an A/B Process Pilot Study", WEF Nutrient Conference, 2013.
De Clippeleir, H., et al., "Mainstream Partial Nitritation / Anammox: Balancing overall Sustainability with Energy Savings", WEFTEC paper, 2012, 10 pages.
Delgado Vela, J. et al., "Prospects for Biological Nitrogen Removal from Anaerobic Effluents During Mainstream Wastewater Treatment", Environ. Sci. Technol. Lett., 2, 234-244, 2015.
Demooij, H.W. et al., "Ammoniacal Nitrogen Removal from Sludge Liquors—Operational Experience with the Demon Process", 15th European Biosolids and Organic Resources Conference, 2010.
Driessen, W., Abma, W., Van Zessen, E., Reitsma, G. and Haarhuis, R., "Sustainable Treatment of Reject Water and Industrial Effluent by Producing Valuable By-Products", 14th European Biosolids and Organic Resources Conference, 2009, 11 pages.
Gilbert, E.M., et al., "Response of Different Nitrospira Species to Anoxic Periods Depends on Opertional DO", Environmental Science & Technology, 48:2934-2941, 2014.
Gilmore, K.R. et al, "Autotrophic Nitrogen Removal in a Membrane-Aerated Biofilm Reactor Under Continuous Aeration: A Demonstration" Environmental Engineering Science, 30(1), 38-45, 2013.
Joss, A. et al, "Combined Nitritation—Anammox: Advances in Understanding Process Stability", Environmental Science & Technology, 45:9735-9742, 2011.

(56) References Cited

OTHER PUBLICATIONS

Lackner, S. et al., "Full-Scale Partial Nitritation/Anammox Experiences—an Application Survey", Water Research 55:292-303, 2014.
Li, X. et al., "Status, Challenges, and Perspectives of Mainstream Nitritation—Anammox for Wastewater Treatment" Water Environment Research, 634-649, Jul. 2018.
Martin, K.J. et al., "The membrane biofilm reactor (MBfR) for water and wastewater treatment: Principles, applications, and recent developments", Bioresource Technology, vol. 122, Oct. 2012, pp. 83-94.
Mulder A. et al., "Anaerobic Ammonium Oxidation Discovered in a Denitrifying Fluidized Bed Reactor", FEMS Microbiology Ecology, 16:177-184, 1995.
Musabyimana, M., "Deammonification Process Kinetics and Inhibition Evaluation", Ph.D. Thesis, Virginia Polytechnic Institute, 2008.
Pellicer-Nacher, C. et al., "Sequential aeration of membrane aerated biofilm reactors for high-rate autotrophic nitrogen removal: experimental demonstration", Environ. Sci. Technol. 2010;44(19):7628-7634.
Regmi, P. et al., "Control of Aeration, Aerobic SRT and COD Input for Mainstream Nitritation/Denitritation", Water Research, vol. 57, Jun. 15, 2014, pp. 162-171.
Stinson, B., et al., "Roadmap Toward Energy-neutrality & Chemical Optimization at Enhanced Nutrient Removal Facilities", WEF Nutrient Conference, Vancouver, 2013.
Syron, E. et al., "Membrane-Aerated Biofilms for High Rate Biotreatment: Performance Appraisal, Engineering Principles, Scale-up, and Development Requirements", Environmental Science and Technology, 42(6): 1833-1844, 2008.
Wett, B., et al., "Development of Enhanced Deammonification Selector" WEFTEC paper, 2012.
Bluetech Research, "The Promise of Advanced Biological Nitrogen Removal via Deammonification: A Critical Step Towards Net Energy Positive Wastewater Conversion", Webinar, Jul. 10, 2014, 108 pages.
Siegrist, H., et al., "Anammox Brings WWTP Closer to Energy Autarky due to Increased Biogas Production and Reduced Aeration Energy for N-Removal", Water Science & Technology, 57.3:383-388, 2008.
International Patent Application No. PCT/US2019/057036, International Preliminary Report on Patentability, dated May 6, 2021.
Epps, Helen et al., "Pore Size and Air Permeability of Four Nonwoven Fabrics", International Nonwovens Journal, Mar. 14, 2007. 8 pages.
Ding, Zhiji, "Engineering and microbial aspects of Anammox process in wastewater treatment", PhD Thesis, University of Paris-Est, 2015, 169 pages.
KWR Watercycle Research Institute, "DynaFil: Efficient Fermentation with Dynamic Filtration", undated, 1 page.
KWR Watercycle Research Institute, "Dynamic Filtration (DynaFil) Efficient & sustainable water treatment", Jun. 21, 2011, 16 pages.
Li, Xiaojin et al. "Nitrogen removal by granular nitritationeanammox in an upflow membrane-aerated biofilm reactor", Water Research 94 (2016) 23-31.
Mozumder, Salatul Islam, "Effect of heterotrophic growth on autotrophic nitrogen removal in a granular sludge reactor", Master's Thesis, Ghent University, 2011, 73 pages.
Sun, Sheng-Peng et al., "Start-up strategies of membrane-aerated biofilm reactor (MABR) for completely autotrophic nitrogen removal", Proceedings of the 2nd IWA Specialized Conference on Nutrient Management in Wastewater Treatment Processes, 2009, 9 pages.
Meng, Fangang et al., "Improving Nitrogen Removal in an Anammox Reactor Using a Permeable Reactive Biobarrier", Water Research, 2014, 1-46.
Hendrickx, Tim L.G., et al., "Autotrophic nitrogen removal from low strength waste water at low temperature", Water Research 46 (2012) 2187-2193.
International Patent Application No. PCT/US2019/057036, International Search Report and Written Opinion, dated Jan. 22, 2020.
Chinese Patent Application No. CN201980069894.0, Office Action dated Apr. 25, 2023.
European Patent Application No. 19812877.9, Office Action dated Aug. 30, 2023.

\* cited by examiner

Biological pathways for nitrogen removal from wastewater

MABR MEDIA FOR SUPPORTING AOB AND ANNAMOX BACTERIA AND PROCESS FOR DEAMMONIFICATION OF WASTEWATER

CROSS-REFERENCE TO RELATED APPLICATIONS

This application is a National Stage Entry of International Application No. PCT/US2019/057036, filed Oct. 18, 2019, which claims the benefit of U.S. Patent Application No. 62/749,259, filed Oct. 23, 2018, which is incorporated herein by reference.

FIELD

This specification relates to membrane aerated biofilm reactors (MABR) and to wastewater treatment.

BACKGROUND

Anammox is an abbreviation for anaerobic ammonium oxidation, a microbial process in which nitrite and ammonium are converted into diatomic nitrogen and water. The abbreviation may also be used to refer to bacteria that perform the anammox process. Some nitrate is also produced as a respiration produce of the anammox bacteria. Deammonification (alternatively called partial nitritation—anammox ammonia oxidation) refers to a process including partial nitritation (i.e. nitritation of some but not all of the ammonium in a wastewater supply) combined with anaerobic ammonium oxidation of the nitrite and remaining ammonium.

In U.S. Pat. No. 6,383,390, the partial nitritation step is carried out in a chemostat reactor at temperature between 25-60° C. and pH of 6.0-7.2. The anammox step is carried out with a different biomass in a separate reactor.

U.S. Pat. No. 7,846,334 describes a method to carry out both of the deammonification reactions in a single sludge sequencing batch reactor (SBR). The method includes control of dissolved oxygen (DO) and pH through intermittent aeration. It is mentioned that a relatively high concentration of ammonia in the reactor helps suppress the development of nitrite oxidizing bacteria (NOB).

U.S. Pat. No. 7,972,513 describes a suspended growth process with three reactions: partial nitritation, anammox and heterotrophic denitrification to remove nitrate produced by respiration of the anammox bacteria.

U.S. Pat. Nos. 7,144,508; 7,267,764; 7,384,553; 7,537,698; 7,556,961; 8,173,419; and, 8,293,109 describe a process wherein nitritation and anammox bacteria are grown on carriers that can be added to various reactor configurations for ammonia removal.

U.S. Pat. No. 8,057,673 describes a reactor containing carriers for growing nitritation and anammox bacteria. Suspended solids are removed from the effluent with membranes. The flow of return activated sludge (RAS) containing DO from membrane aeration is controlled to optimize the deammonification reactions.

U.S. Pat. No. 8,246,830 describes a process to remove ammonia from raw sewage by deammonification. A 2-layer carrier is used wherein nitritation occurs in the first layer which is exposed to DO in the tank, and the anammox reaction occurs in the core of the carrier.

In US Patent Application Publication 2013/0264280 A1 anammox bacteria are grown on a biofilm carrier which is moved between a mainstream reactor and a side-stream reactor. The population of anammox bacteria decreases in the mainstream reactor and gets replenished in the side-stream reactor.

In International Publication WO 2018/136350 A1 the growth of NOB is suppressed by maintaining a phosphorus deficiency in wastewater subjected to nitritation.

In membrane biofilm reactors (MBfR), a gas transfer membrane is used to support a biofilm while one or more gasses are supplied to the biofilm through the membrane. Membrane-aerated biofilm reactors (MABR) are a subset of MBfR where an oxygen containing gas is used in the bio-reaction. Efforts to use MABR for deammonification were recently reviewed by Li et al (2018). Efforts to address the challenge of NOB outcompeting AOB in the biofilm include controlling air pressure inside the membrane in an effort to match the ammonia and oxygen transfer rates and thereby (Gilmore et. al., 2013) and by periodically turning off the air (or oxygen) supply (Pellicer-Nacher, 2010). Efforts to encourage the growth of the anammox bacteria include growing a thick biofilm with an anaerobic zone in a radial zone away from the membrane surface (where oxygen abounds). In one example, the membrane surface is covered with a non-woven fabric to help prevent loss of the anammox bacteria when the media is scrubbed to control the biofilm thickness (Gong et. al., 2007).

INTRODUCTION TO THE INVENTION

The specification describes an apparatus and process useful for the biological conversion of ammonia in water through a partial nitritation and anammox ammonia oxidation (deammonification) reaction. The apparatus, which is used in the process, combines gas transfer membranes with a porous material applied over only a part of the gas transfer membranes.

A membrane aerated biofilm media described herein has a discontinuous layer of a porous material covering part of the outer surface of one or more gas-transfer membranes. The porous material may have a void fraction of 50% or more. The porous material may have a thickness of up to about 500 microns. The porous material may form a pattern, made up of portions of the material and openings without the material, having dimensions on the same order of magnitude as its thickness.

The media may be used to carry on a deammonification reaction. In use, ammonia oxidizing bacteria (AOB) and anammox bacteria grow in or on the media, with the anammox bacteria located primarily in the porous material. The supply of oxygen through the gas-transfer membrane can be limited to suppress the growth of nitrite oxidizing bacteria (NOB). Excess biofilm can be removed, for example by coarse bubble scouring.

The media may be placed within the main stream of an activated sludge plant, for example in a pre-anoxic zone, optionally by way of retrofitting an existing plant. There may be an aerobic zone downstream of an anoxic zone containing the media. The porous material of the media may be pre-populated with anammox bacteria. Nitrite oxidizing bacteria may be controlled using oxygen partial pressure control, for example by way of an intermittent supply of oxygen. In some examples, additional downstream unit operations are not required to treat residual products such as nitrate. The media may operate in a relatively high C/N environment, i.e. without requiring a biological process upstream of the media-containing zone. However, the deammonification process may optionally follow enhanced primary treatment.

DETAILED DESCRIPTION

One trend in the pursuit of energy efficient wastewater treatment involves diverting organic matter (for example with enhanced primary treatment) to sludge treatment (i.e. anaerobic digestion) for energy production. This objective is difficult to achieve with conventional biological treatment, for example activated sludge processes, when faced with stringent nitrogen removal criteria. Deammonification allows a significant reduction of the energy required for ammonia removal as compared to the traditional nitrification-denitrification pathway and is compatible with organic matter diversion.

Figure 1:
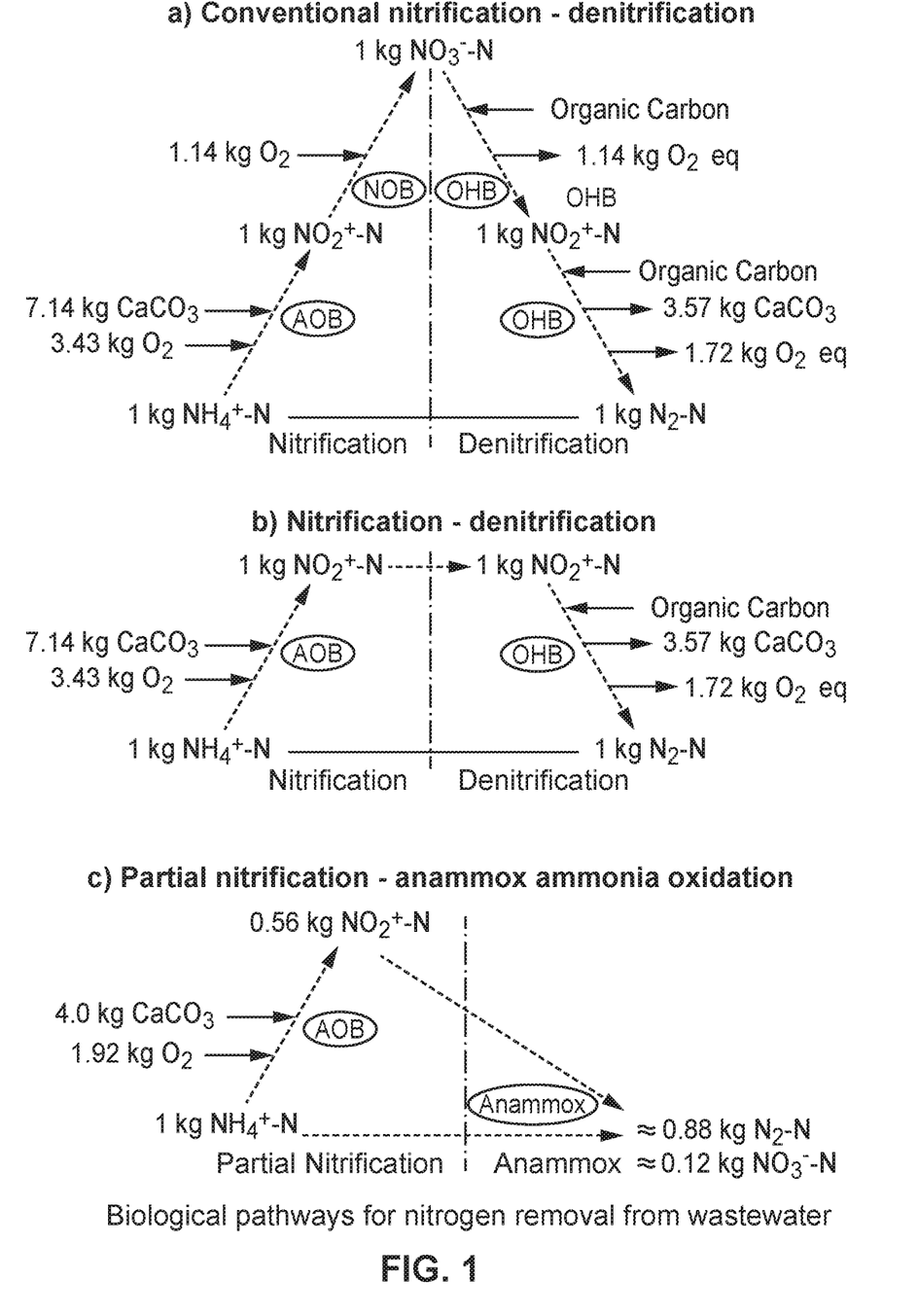
FIG. 1 is a diagram showing three biological pathways for nitrogen removal from wastewater.

Three biological pathways for nitrogen removal are described in simplified form in FIG. 1, where all quantities were normalized to the conversion of 1 kg of $NH_4^+$—N. In this figure, the stoichiometry for ammonia oxidation does not consider the requirements for cell synthesis or the release of microbial products unless specifically noted.

In part a) of FIG. 1, the conversion of ammonia to nitrate is described as a two-step process: nitritation by ammonia oxidizing bacteria (AOB) and nitrification by nitrite oxidizing bacteria (NOB). From a stoichiometric point of view, nitritation requires 3.43 kg $O_2$/kg $NH_4^+$—N and nitrification requires 1.14 kg $O_2$/kg $NO_2^-$—N, for a total of 4.57 kg $O_2$/kg $NH_4^+$—N. The nitritation step consumes alkalinity (7.14 kg of $CaCO_3$/kg $NH_4^+$—N) for the neutralization of the $H^+$ ions released by the oxidation of ammonia. A small amount of inorganic carbon is required for autotrophic cell growth, but this quantity is neglected.

Biological denitrification also occurs in two steps as nitrate is first reduced to nitrite and then to nitrogen gas. Denitrification is achieved under anoxic conditions when ordinary heterotrophic bacteria (OHB) use nitrate or nitrite for respiration in lieu of oxygen. This process therefore provides an oxygen equivalent "credit" of 1.14 kg $O_2$ eq (for conversion of $NO_3^-$ to $NO_2^-$) and 1.72 kg $O_2$ eq (for conversion of $NO_2^-$ to $N_2$), for a total of 2.86 kg $O_2$ eq/kg $NO_3^-$—N denitrified. The second step (denitritation) also restores half of the alkalinity used for nitritation (3.57 kg $CaCO_3$/kg $NO_2^-$—N) as $H^+$ ions are consumed for the reduction of nitrite to nitrogen gas.

Denitrification by OHB consumes organic matter. The actual amount of readily biodegradable-soluble COD (bsCOD) is dependent on sludge retention time (SRT) of the anoxic sludge and typically varies between 4.0-7.0 kg COD/kg N denitrified, with the higher value corresponding to lower SRT.

In part b) of FIG. 1, nitritation-denitritation is a short-cut pathway that involves converting ammonia to nitrite and then converting nitrite directly to nitrogen gas by denitritation. This pathway is enabled by the same bacteria as nitrification-denitrification, but requires operating conditions where NOB are inhibited or outcompeted. As compared to full nitrification-denitrification, the nitritation-denitritation pathway offers the potential to reduce oxygen demand by 25% ((4.57−3.43)/4.57) and the organic matter required by 40% ((2.86−1.72)/2.86); the alkalinity balance is not affected.

Part c) of FIG. 1 shows the partial nitritation-anammox ammonia oxidation (deammonification) short-cut pathway. This pathway uses autotrophic anammox bacteria. The stoichiometry shows that roughly half of the ammonia that will be converted is first oxidized to nitrite. The anammox bacteria can then oxidize the remaining ammonia under anaerobic conditions using nitrite as an electron acceptor. A small amount of nitrate is produced (≈12%) as the anammox bacteria oxidize nitrite for respiration.

Part c) of FIG. 1 shows that about 56% of the ammonia is first converted to nitrite, requiring 1.92 kg $O_2$/kg $NH_4^+$—N, a savings of 58% ((4.57−1.92)/4.57) compared to full nitrification. Similarly, alkalinity consumption is cut by about half due to partial nitritation, but the conversion to $N_2$ does not release alkalinity, so the overall reaction has essentially the same net alkalinity consumption as full nitrification-denitrification.

Anammox bacteria are autotrophic and therefore the conversion of ammonia to nitrogen gas does not require organic carbon. It has been reported that anammox bacteria have a slow growth rate (about 14 times lower than AOB) and a low yield.

One of the factors that help to enable short-cut biological nitrogen removal (the pathways in parts b) and c) of FIG. 1) is to promote NOB out-selection to prevent the formation of nitrate. Suppression of NOB is aided by, for example, i) at high temperature, ii) low DO, iii) residual ammonia inhibition and iv) at low sludge retention time. In a deammonification process, a method is also required to retain or recover the slow-growing anammox bacteria. Other issues include that nitrite is inhibitory to the AOBs (i.e., product inhibition), while the anammox bacteria can be inhibited by high DO concentration. Further, since there is no on-line measurement method for nitrite, DO and pH have to be very precisely controlled in prior art processes. Recovery from upsets can take several months.

While at least some of the factors described above might be practically addressed in some in high ammonia side streams, they are difficult to achieve in the main stream of a municipal wastewater treatment plant, for example an activated sludge plant. The process factors used to inhibit the production of nitrate when treating concentrated ammonia effluents are not available for typical municipal wastewater (in the main stream) where the temperature is lower and ammonia inhibition cannot be practiced (since it is normally an objective to reach low ammonia in the effluent). In addition, municipal effluents have a high C/N, which promotes the development of OHB and denitrification.

Implementing deammonification in the main stream of an activated sludge municipal wastewater treatment plant faces various challenges such as:

1. High C/N leading to OHB outcompeting anammox bacteria for use of nitrite
2. Robustness of nitritation via retention of AOB against NOB
3. Effective retention of anammox bacteria
4. Adverse effect of low temperature
5. Reliable process control
6. Removal of residual contaminants (nitrate, organic residues and nitrous oxide).

This specification describes a supported growth media adapted for use in supporting a deammonification reaction. The media helps address some of the problems described above by supporting a mixed population of AOB and anammox bacteria each in different environments. In a process, the media is operated to help maintain healthy populations of AOB and anammox bacteria and/or inhibit competition by NOB and OHB. The media may be deployed in an anoxic zone in the main stream of an activated sludge plant, for example in a pre-anoxic zone as in a Modified Ludzack-Ettinger process.

The media, and/or individual pieces of medium within the media, include one or more gas transfer membrane. Although gas transfer membranes can be hydrophobic porous membranes, it is preferred to use a dense walled material or a material with pores small enough (i.e. <40 Angstroms) to prevent bulk water flow. The gas transfer membranes can have any form factor. For example, the gas transfer membranes can be in the form of a flat sheet or discrete hollow fibres, for example as in products made by 3M, Emefcy (Now Fluence Products and Innovation Ltd), or Oxymem. Alternatively, the gas transfer membranes may be a plurality of hollow fiber gas transfer membranes in a cord as in the ZeeLung™ product sold by Suez. Such a cord is described in International Publication Number WO 2015/142586 A2, which is incorporated herein by reference. In the case of a cord, or another structure with multiple gas transfer membranes smaller than the expected biofilm thickness, the gas transfer surface can be represented by a smooth surface covering the individual membranes.

The gas transfer membrane(s) are partially covered by a porous material. The word "porous" is not intended to imply any particular morphology, but only that the material has various holes, openings or other voids that bacteria can enter and a gas or liquid could flow into or through. The porous material can have a porosity or void fraction of over 50%. The porous material may be, for example, a non-woven material, or woven or knitted material, a yarn or a tow. In the case of a yarn or tow, the filaments or not tightly twisted or tightly stretched. Optionally, the filaments in a woven or knitted material, or a yarn or tow, may be crimped, curled or another bulky structure.

The surface of the gas transfer membrane of the medium is partly covered (for example between 20-60% or between 30-50%) with the porous material. The thickness of the porous material may be up to 500 microns, for example in the range of 50-500 microns, or 100-300 microns. The use of thicker biofilms (without or with a protective porous layer) is possible but is likely to create diffusion limitations and low treatment rates. Coverage by the porous material is such that the surface of the media has an array of openings, or a pattern of alternating hills and valleys in one or more directions. In the valleys or other openings, the surface of the gas transfer membrane(s) is exposed. The openings may have the shape, for example, of a square, rectangle, lozenge (i.e. a diamond), triangle, circle, oval or long strip.

Figure 2:
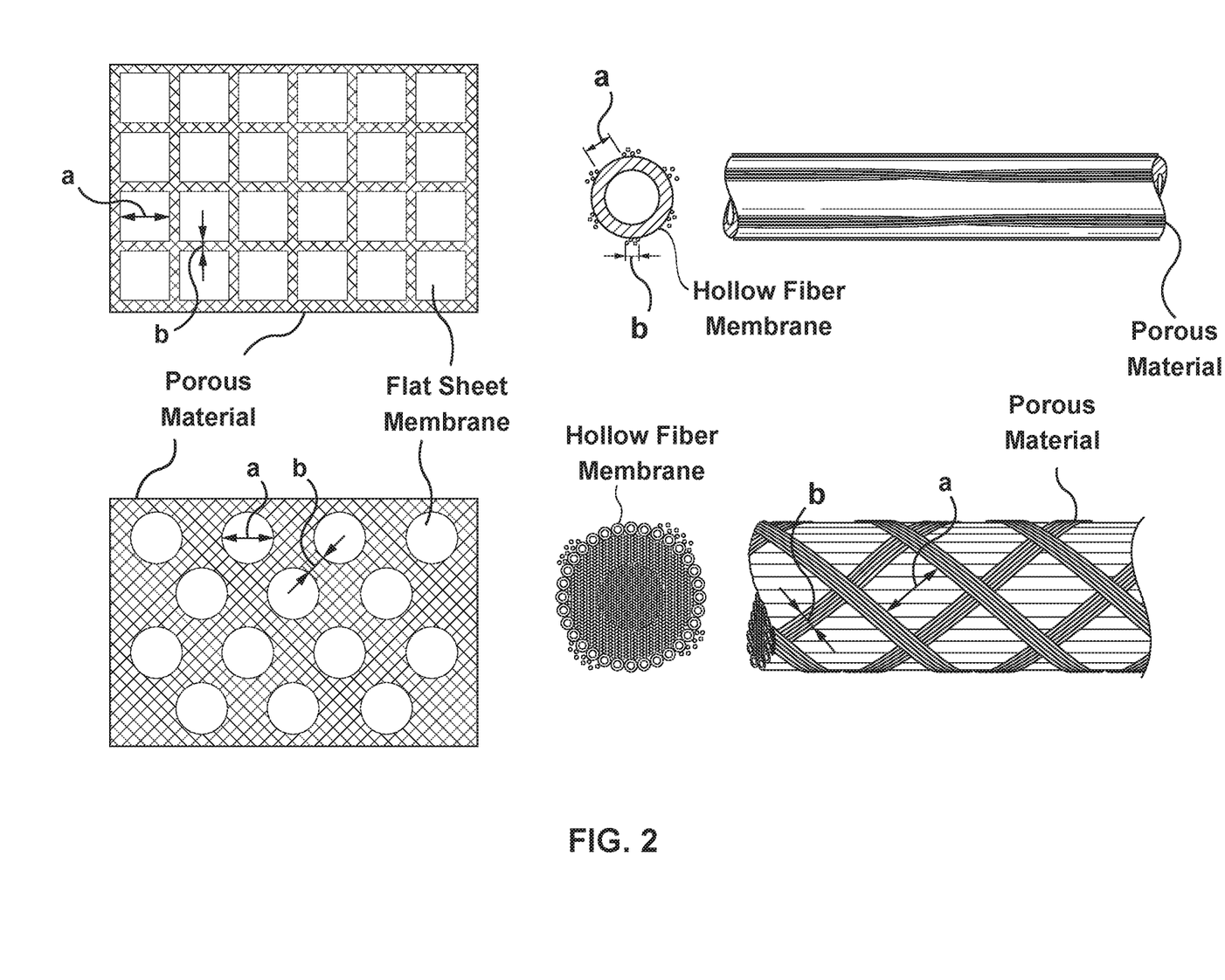
FIG. 2 is a schematic drawing of four examples of membrane aerated biofilm media.

Examples of the medium are shown in FIG. 2. In these examples, the defining dimensions of the pattern are "a" (the length of the openings) and "b" (the width of the porous material between openings). These dimensions may be measured as illustrated in FIG. 2. Alternatively, the dimension "a" may be an average of the distances between each of two pairs of parallel lines in a four sided figure, the distance between two sides of a strip (i.e. an opening with two generally parallel sides and a length at least 4 times its width), a diameter or the average of distances across the major and minor axes of elliptical or oval shapes. In another alternatively, the dimension "a" may be the diameter of a circle of an equivalent area as the opening. The length "a" may be between 1-4 times, or 2-3 times the thickness of the porous material. Alternatively, the distance "b" may be the minimum distance between two openings, or a weighted average of distances between openings. The width "b" may be, for example, between 0.5 and 2 times, or approximately equal to, the thickness of the highly porous material.

In part a) of FIG. 2, a flat-sheet membrane is covered with porous yarns or tows, optionally woven together into an open fabric. Square or rectangular openings are formed between the yarns or tows.

In part b) of FIG. 2, a flat-sheet membrane is covered with a porous non-woven or textile sheet material having openings. The openings could be circular as shown or another shape. The openings can be, for example, punched in the porous material.

In the examples in parts a) and b) of FIG. 2, the porous material can be attached to the surface of the gas transfer membrane, for example by gluing or welding. The attachment can be continuous, as in with lines of glue or welding extending across the membrane, or discontinuous, as in with dots of glue or welding spaced across the membrane. Alternatively, the porous material may be merely placed against the gas transfer membrane and held by potting or otherwise attaching one or more edges of the porous material to a frame or header holding the edges of the flat sheet membrane.

In part c) of FIG. 2, a discrete hollow fiber is covered with an array of porous material in an elongated or strip form separated by longitudinal openings. The porous material can be, for example, twisted, non-woven or woven yarn laid down longitudinally on the surface of the hollow fiber. The porous material may be adhered to the membrane, for example by gluing or welding, or held in place by wrapping with a light yarn over it.

In part d) of FIG. 2 a cord with a plurality of hollow fiber membranes substantially surrounded a core is wrapped with porous material in an elongated or strip form providing square or lozenge (i.e. diamond) shaped openings. The porous material can be, for example, a twisted, non-woven or woven yarn laid down by wrapping in one or more directions.

In all of these media examples, the porous material can alternatively be 3D printed on the surface of the gas transfer membrane(s).

In use, the media defines two zones, in the porous material and in the openings, where populations of AOB and anammox bacteria can preferentially develop. Near the surface of the membrane (i.e., the first 100-200 microns of biofilm), there is a relatively high concentration of oxygen to support the development of AOBs. This is especially true in the membrane openings where the biofilm can remain thin and ammonia can more readily penetrate the biofilm to be converted to nitrite. The void spaces within the porous material contain anammox bacteria. At least parts of the porous material are far enough from the membrane surface to be substantially oxygen-free, but close enough to intercept the nitrite diffusing back from the inside of the biofilm.

For both reactions, nitritation and anammox ammonia oxidation, there will be competition. Near the surface of the gas transfer membrane, the main competitor of the AOB for oxygen will be the NOB. In a conventional nitrifying MABR, both populations exist, and ammonia is converted to nitrate. However, in a process described herein, the air or oxygen flow through the membrane is interrupted on a regular basis (e.g., 10 min/hour). This creates an alternating aerobic-anoxic environment in which the AOB can outcompete the NOB and the nitrification reaction stops at nitrite. OHB could also compete for oxygen near the membrane surface if organic carbon were able to diffuse fast enough within the biofilm. However, soluble COD is mostly composed of large organic molecules, which do not diffuse as fast as ammonia. It has been demonstrated by modelling (GPS-X, Hydromantis) that for a typical municipal effluent, very little of the oxygen is used by OHB.

In the outer surface of the biofilm both anammox bacteria and OHB will be present and will compete to use the nitrite diffusing away from the membrane surface. There are three aspects of the media and process described herein that may favor the anammox bacteria over OHB. First, at least parts of the porous material are close to the membrane but in an anaerobic environment. Second, the porous material can optionally be prepopulated with anammox bacteria before or during the start-up of the process. Third, the media can be scoured, for example with coarse bubbles, to prevent the development of a thick biofilm.

The two desirable bacterial populations necessary for the reaction (AOB and anammox) are slow-growing, but in the media they are both protected in niche environments: the AOB in the valleys close to the membrane surface; the anammox bacteria in the porous media. Scouring is used to prevent attachment of OHB, especially in the openings (valleys) to maintain a thin biofilm that will promote a high flux of ammonia.

In summary, anammox bacteria populate the voids in at least an outer part of the porous material where they are in an anaerobic environment and protected from scouring, yet close to the aerobic biofilm where ammonia oxidation to nitrite occurs. The media has an uneven surface with a fraction where the membrane surface is exposed and covered with a thin biofilm for nitritation and a fraction covered by the porous material for the anammox reaction.

Figure 3:
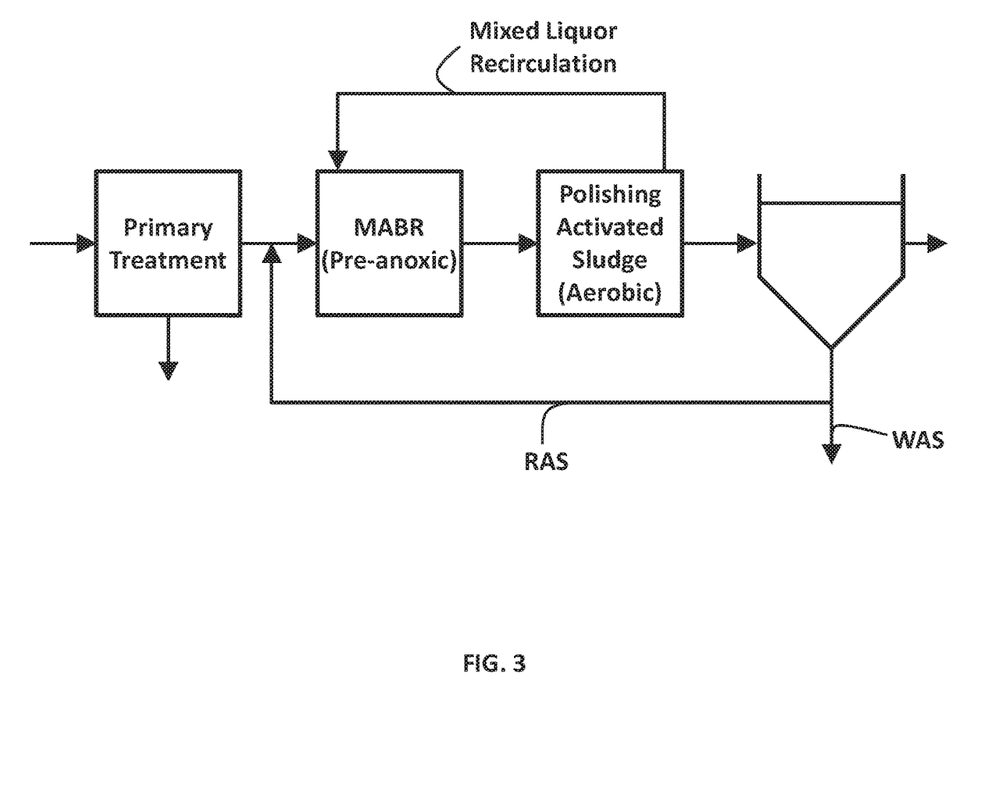
FIG. 3 is a schematic drawing of an example of an activated sludge plant including a membrane aerated biofilm media.

FIG. 3 represents an example of a flow diagram for the implementation of the deammonification reaction for mainstream wastewater treatment. Optionally, the media described herein is retrofitted into a conventional activated sludge plant. The media can be deployed, for example, in a pre-anoxic zone of an activated sludge plant. The pre-anoxic zone may be an existing zone or created by turning off aeration in part of an aerobic zone. The anoxic zone could also be part of an anoxic/aerobic swing zone, or the media may be placed in a very low dissolved oxygen zone. The plant implements a hybrid process, with a suspended biomass around the media and a biofilm attached to the media. A second stage of the process may be a polishing step under aerobic conditions.

In an example, the media is placed in a pre-anoxic zone of a Modified Ludzack-Ettinger process. The main stream of the process comprises optional primary treatment followed by the pre-anoxic zone followed by an aerobic zone followed by a secondary separation step. Return activated sludge flows from the secondary separation step to the inlet of the pre-anoxic zone. There is also mixed liquor recirculation from the end of the aerobic tank to the front of the pre-anoxic zone.

In the configuration in FIG. 3, the COD of the incoming wastewater is reduced by denitrification in the bulk (i.e., suspended biomass) of the pre-anoxic media reactor. Nitrate for this reaction comes from the anammox reaction (the 13% respirated by the bacteria) and from the return activated sludge (since the deammonification process does not remove ammonia completely, there is some nitrification taking place in the second stage). The soluble-biodegradable COD removed in this manner is sufficient to reduce the COD to a level where it does not interfere with the deammonification process.

The media and process described herein address one or more of the implementation challenges described above.

Regarding the problem of high C/N leading to OHB outcompeting anammox bacteria for use of nitrite, oxygen is delivered using a membrane, which provides reverse profiles for oxygen and substrate. This results in the oxygen being primarily used for ammonia over carbon oxidation.

Regarding the problem of robustness of nitritation via retention of AOB against NOB, NOB are outcompeted through reduction, for example by modulation in time, of the oxygen partial pressure on the gas side of the membrane.

Regarding the problem of effective retention of anammox bacteria, anammox bacteria are retained in a biofilm, within a porous material which offers protection against erosion or abrasion.

Regarding the adverse effect of low temperature, the two bacterial populations are retained within the engineered media which partly addresses the issue of lower growth rates at low temperature.

Regarding process control, complex automatic control is not required to implement the process. The only controlled parameter (cycling of oxygen partial pressure) can be optionally done with a timer.

Regarding removal of residual contaminants (nitrate, organic residues and nitrous oxide), since the deammonification reaction is carrier out upstream in a treatment plant, residual contaminants can be removed in a downstream polishing step.

I claim:

1. A medium comprising,
    one or more gas transfer membranes having an outer gas transfer surface; and,
    a material having a thickness of up to 500 microns and a void fraction of at least 50% covering only a portion of the outer gas transfer surface of the gas transfer membranes.

2. The medium of claim 1 wherein the one or more gas transfer membranes comprise a plurality of hollow fiber gas transfer membranes provided in a cord.

3. The medium of claim 2 wherein one or more strands of the material are wrapped around the hollow fiber membranes.

4. The medium of claim 1 wherein the material covers 20-60% of an otherwise exposed surface of the one or more gas transfer membranes.

5. The medium of claim 1 having openings between portions of the material, wherein the length of the openings in at least one direction is in a range of 1 to 4 times the thickness of the material.

6. The medium of claim 1 wherein the width of portions of the material in at least one direction is in a range of 0.5 to 2 times the thickness of the material.

7. The medium of claim 1 comprising anammox bacteria present in the void fraction of the material.

8. A process comprising steps of,
    immersing a medium in water comprising ammonia, the medium comprising one or more gas transfer membranes and a discontinuous layer of a porous material having an array of openings and covering 20-60% of the one or more gas transfer membranes such that a surface of the medium has the one or more gas transfer membranes exposed through the array of openings;
    providing a gas comprising oxygen to the inside of the one or more gas transfer membranes;

growing a population of bacteria outside of the one or more gas transfer membranes wherein the bacteria include ammonia oxidizing bacteria (AOB) present in the array of openings and anammox bacteria present in the porous material.

9. The process of claim 8 wherein the medium is a medium comprising a material having a thickness of up to 500 microns and a void fraction of at least 50% covering only a portion of the one or more gas transfer membranes.

10. The process of claim 8 wherein the AOB and anammox bacteria carry out a deammonification reaction.

11. The process of claim 8 wherein a supply of oxygen through the one or more gas-transfer membranes is limited to suppress a growth of nitrite oxidizing bacteria (NOB).

12. The process of claim 8 comprising removing excess biofilm.

13. The process of claim 8 wherein the medium is placed in an anoxic zone of an activated sludge plant.

14. The process of claim 13 wherein the anoxic zone of the activated sludge plant is upstream of an aerobic zone.

15. The process of claim 8 comprising pre-populating the medium with anammox bacteria.

16. The process of claim 8 comprising removing excess biofilm by coarse bubble scouring.

17. A process for treating wastewater comprising immersing a medium supporting AOB and anammox bacteria in an anoxic zone in a main stream of an activated sludge plant, wherein the medium comprises one or more gas transfer membranes and a porous material having an array of openings and covering 20-60% of a surface of the one or more gas transfer membranes.

18. The process of claim 17 wherein the activated sludge plant has an aerobic zone downstream of the anoxic zone.

19. The process of claim 17 wherein water in the anoxic zone has a C/N ratio which promotes the development of ordinary heterotrophic bacteria (OHB) and denitrification.

* * * * *